(12) United States Patent
Xu et al.

(10) Patent No.: US 11,936,186 B2
(45) Date of Patent: Mar. 19, 2024

(54) METHOD AND APPARATUS FOR EVALUATING A DEGREE OF FREQUENCY REGULATION URGENCY OF A GENERATOR SET, POWER SYSTEM, AND STORAGE MEDIUM

(71) Applicants: STATE GRID FUJIAN ELECTRIC POWER COMPANY LIMITED, Fuzhou (CN); STATE GRID FUJIAN ELECTRIC POWER RESEARCH INSTITUTE, Fuzhou (CN); CHINA ELECTRIC POWER RESEARCH INSTITUTE COMPANY LIMITED, Beijing (CN)

(72) Inventors: Zhenhua Xu, Fuzhou (CN); Risheng Fang, Fuzhou (CN); Ting Huang, Fuzhou (CN); Dahai Yu, Beijing (CN); Kewen Li, Fuzhou (CN); Xiangyu Tao, Beijing (CN); Daoshan Huang, Fujian (CN); Yi Su, Fuzhou (CN); Zhi Chen, Fuzhou (CN); Danyue Wu, Fuzhou (CN); Huiyu Zhang, Fuzhou (CN)

(73) Assignees: STATE GRID FUJIAN ELECTRIC POWER COMPANY LIMITED, Fuzhou (CN); STATE GRID FUJIAN ELECTRIC POWER RESEARCH INSTITUTE, Fuzhou (CN); CHINA ELECTRIC POWER RESEARCH INSTITUTE COMPANY LIMITED, Beijing (CN)

( * ) Notice: Subject to any disclaimer, the term of this patent is extended or adjusted under 35 U.S.C. 154(b) by 535 days.

(21) Appl. No.: 17/271,588

(22) PCT Filed: Jan. 17, 2020

(86) PCT No.: PCT/CN2020/072683
§ 371 (c)(1),
(2) Date: Feb. 25, 2021

(87) PCT Pub. No.: WO2020/151587
PCT Pub. Date: Jul. 30, 2020

(65) Prior Publication Data
US 2021/0257837 A1 Aug. 19, 2021

(30) Foreign Application Priority Data

Jan. 26, 2019 (CN) .......................... 201910077606.8

(51) Int. Cl.
*H02J 3/24* (2006.01)
*G05B 19/042* (2006.01)
*H02J 13/00* (2006.01)

(52) U.S. Cl.
CPC .............. *H02J 3/24* (2013.01); *G05B 19/042* (2013.01); *H02J 13/00002* (2020.01); *G05B 2219/2639* (2013.01)

(58) Field of Classification Search
CPC .... H02J 3/24; H02J 13/00002; G05B 19/042; G05B 2219/2639
(Continued)

(56) References Cited

U.S. PATENT DOCUMENTS

| | | | |
|---|---|---|---|
| 10,892,618 B1 * | 1/2021 | Cooper | ...................... H02J 9/00 |
| 11,150,618 B2 * | 10/2021 | Frolik | ...................... H02J 13/00 |
| 2015/0295402 A1 * | 10/2015 | Black | ................ H02J 13/00022 |
| | | | 700/291 |

FOREIGN PATENT DOCUMENTS

| CN | 102323550 A | 1/2012 |
|---|---|---|
| CN | 103050992 A | 4/2013 |

(Continued)

OTHER PUBLICATIONS

International Search Report issued from the International Search Authority to Application No. PCT/CN2020/072683 dated Apr. 24, 2020, 5 pages.
(Continued)

*Primary Examiner* — Md Azad
(74) *Attorney, Agent, or Firm* — Hunton Andrews Kurth LLP

(57) ABSTRACT

Provided are a method and apparatus for evaluating a degree of frequency regulation urgency of a generator set, a power system and a storage medium. The method includes obtaining a power grid frequency fluctuation trend under a normal operation condition and a power grid frequency fluctuation trend under a fault condition through simulation analysis based on the proportion η of the installed capacity of each of multiple types of generator sets in a regional power grid;
(Continued)

obtaining a degree P of frequency regulation participation of each of the multiple types of generator sets based on the power grid frequency fluctuation trends under the normal operation condition and the fault condition; and calculating a degree U of frequency regulation urgency of each of the multiple types of generator sets in a power system based on the degree P of frequency regulation participation of each of the multiple types of generator sets and the proportion η of the installed capacity of a respective type of generator set corresponding to the degree P of frequency regulation participation, and implementing frequency regulation participation of the regional power grid in the power system based on the degree U of frequency regulation urgency.

16 Claims, 9 Drawing Sheets

(58) Field of Classification Search
USPC .......................................................... 700/291
See application file for complete search history.

(56) References Cited

FOREIGN PATENT DOCUMENTS

| CN | 105449701 A | 3/2016 |
| CN | 108462212 A | 8/2018 |
| CN | 108695884 A | 10/2018 |
| CN | 108777481 A | * 11/2018 |
| CN | 108777481 A | 11/2018 |
| CN | 108802609 A | 11/2018 |
| CN | 109802438 A | 5/2019 |

OTHER PUBLICATIONS

First Chinese Office Action, The State Intellectual Property Office of People's Republic of China, issued to CN Application No. 201910077606.8 dated Jan. 26, 2019, 9 pages.

* cited by examiner

METHOD AND APPARATUS FOR EVALUATING A DEGREE OF FREQUENCY REGULATION URGENCY OF A GENERATOR SET, POWER SYSTEM, AND STORAGE MEDIUM

CROSS-REFERENCE TO RELATED APPLICATIONS

This application is a United States national stage application of International Patent Application No. PCT/CN2020/072683, filed on Jan. 17, 2020, which claims priority to Chinese Patent Application No. 201910077606.8, filed with the China National Intellectual Property Administration (CNIPA) on Jan. 26, 2019, the disclosures of which are incorporated herein by reference in their entireties.

TECHNICAL FIELD

The present application relates to the technical field of simulation and modeling of a power system, for example, to a method and apparatus for evaluating a degree of frequency regulation urgency of a generator set, a power system and a storage medium.

BACKGROUND

In recent years, as the large-scale grid integration of clean energies such as wind power and nuclear power continues to proceed, the impact of the clean energies on the power grid has received extensive attention from the industry.

The current study on power grid frequency regulation requirements is focused on the study on power system frequency regulation requirements after large-scale wind power is integrated into the power grid. That is, after the wind power is integrated into the power grid, due to the intermittence and fluctuation of the output of a wind power generator set, it is required to evaluate the range of power grid frequency fluctuations caused in cases where the power grid is in the output limit of the wind power. Based on the actual penetration of the wind power generator set, in conjunction with the range of power grid frequency fluctuations caused by the actual output of the wind power generator set, within the limit of the range of frequency fluctuations, the feasible output of the wind power generator set is obtained. Through the comparison between the actual output and the feasible output, the capacity for the power grid frequency regulation requirements is obtained. In this case, the wind power is used as one variable power source. A nuclear power generator set is quite different from the wind power generator set in terms of the steady-state output characteristic and the transient-state response characteristic: (1) The output of the wind power generator set is intermittent and fluctuating, while the output of the nuclear power generator set is able to keep constant for a long time. (2) The transient-state response characteristic of the wind power generator set and that of the nuclear power generator set are quite different, and the wind power generator set generally does not participate in frequency regulation in cases where the power grid frequency fluctuates.

As regards clean energy frequency regulation in the related art, the study is focused on power system frequency regulation in which the wind power participates, and there is no relevant study on power system frequency regulation in which the nuclear power generator set participates. Furthermore, due to the intermittence and fluctuation of the wind power, it is required to configure a certain reserve capacity in a power system to satisfy frequency regulation requirements. The study on the frequency regulation requirements is from the perspective of the capacity required for the frequency regulation, and is not highly correlated with that the nuclear power generator set which generally operates with a base load and does not have characteristics such as the intermittence or fluctuation.

SUMMARY

The present application provides a method and apparatus for evaluating a degree of frequency regulation urgency of a generator set, a power system and a storage medium. The present application proposes, from the perspective of a power system with respect to a nuclear power generator set, to quantify the degree of requirement of frequency regulation based on the proportion of an installed capacity and the characteristic of a regional power grid.

Embodiments of the present application provide a method for evaluating a degree of frequency regulation urgency of a generator set. The method includes the steps described below.

A power grid frequency fluctuation trend under a normal operation condition and a power grid frequency fluctuation trend under a fault condition are obtained through simulation analysis based on the proportion of the installed capacity of each of a plurality of types of generator sets in a regional power grid; and the degree P of frequency regulation participation of each of the plurality of types of generator sets is obtained based on the power grid frequency fluctuation trend under the normal operation condition and the power grid frequency fluctuation trend under the fault condition.

The degree U of frequency regulation urgency of each of the plurality of types of generator sets in a power system is calculated based on the degree P of frequency regulation participation of each of a plurality of types of generator sets and the proportion $\eta$ of the installed capacity of a respective type of generator set corresponding to the degree P frequency regulation participation, and frequency regulation participation of the regional power grid in the power system is implemented based on the degree U of frequency regulation urgency.

In an embodiment of the present application, before the power grid frequency fluctuation trend under the normal operation condition and the power grid frequency fluctuation trend under the fault condition are obtained through simulation analysis based on the proportion $\eta$ of the installed capacity of each of a plurality of types of generator sets in the regional power grid, the method further includes acquiring a steady-state frequency characteristic of the regional power grid based on annual frequency statistics obtained by a supervisory control and data acquisition (SCADA) system.

In an embodiment of the present application, the plurality of types of power generator sets include a thermal power generator set, a hydropower generator set and a nuclear power generator set.

In an embodiment of the present application, a preset number of preset faults are configured for each distinct regional power grid and each of the preset faults is for a fault that has occurred more than a preset number of times in a corresponding regional power grid.

In an embodiment of the present application, the degree U of frequency regulation urgency and the degree P of frequency regulation participation of each of the plurality of types of generator sets in the power system are calculated using the formula described below.

$$\begin{cases} U_i = (1-P_i)\Box\eta_i \\ P_i = \dfrac{S_i}{S} \end{cases}.$$

In the formula, $U_i$ denotes the degree of frequency regulation urgency of an i-type generator set in the power system, $S_i$ denotes a frequency regulation integral area of the i-type generator set deducting a deadband within frequency fluctuation time T, and S denotes a frequency regulation integral area within the frequency fluctuation time T of the power grid; i=1, 2 and 3, indicating that types of generator sets are a thermal power generator set, a hydropower generator set and a nuclear power generator set respectively.

In an embodiment of the present application, the degree P of frequency regulation participation depends on the size and direction set for the deadband in the generator set. The greater the set deadband is, the less the degree of frequency regulation participation of the generator set in a primary frequency regulation process is; and the less the set deadband is, the greater the degree of frequency regulation participation of the generator set in a primary frequency regulation process is. The degree $P_i$ of frequency regulation participation of each of a plurality of types of generator sets in primary frequency regulation is calculated using the formula described below.

$$P_i = \dfrac{\int_0^T (f - D_i)dt}{\int_0^T f dt}.$$

In the formula, f denotes a power grid frequency variation, and $D_i$ denotes a deadband of a speed regulation system of the i-type generator set.

In an embodiment of the present application, the frequency fluctuation time T is 60 s, and the degree $P_i$ of frequency regulation participation of each of a plurality of types of generator sets in the primary frequency regulation is calculated using the formula described below.

$$P_i = \dfrac{\int_0^{60} (f - D_i)dt}{\int_0^{60} f dt}.$$

In an embodiment of the present application, based on the degree $P_i$ of frequency regulation participation of the generator set in the primary frequency regulation, the degree U of frequency regulation urgency of each of the plurality of types of generator sets in the power system is calculated using the formula described below.

$$U_i = \eta_i \times \left(1 - \dfrac{\int_0^{60} (f - D_i)dt}{\int_0^{60} f dt}\right).$$

In the formula, $\eta_i$ denotes the proportion of the installed capacity of the i-type generator set.

DETAILED DESCRIPTION

The solution of the present application is described with reference to the drawings.

Figure 1:
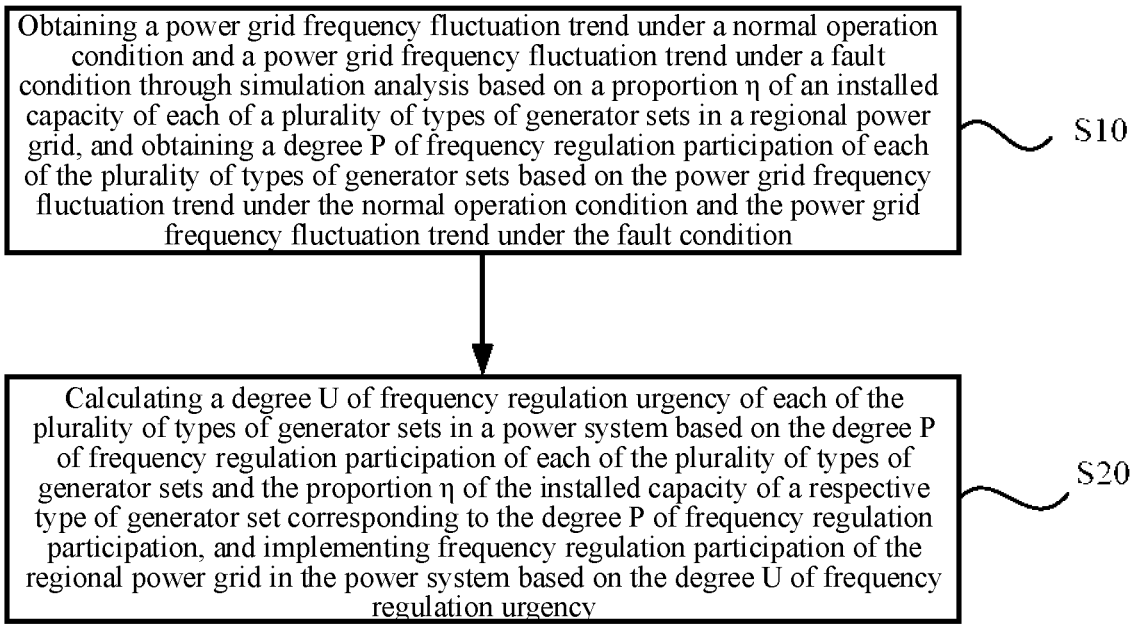
FIG. 1 is a flowchart illustrating a method for evaluating a degree of frequency regulation urgency of a generator set according to an embodiment of the present application.

Embodiments of the present application provide a method for evaluating a degree of frequency regulation urgency of a generator set. As illustrated in FIG. 1, the method includes the steps described below.

In S10, a power grid frequency fluctuation trend under a normal operation condition and a power grid frequency fluctuation trend under a fault condition are obtained through simulation analysis based on the proportion η of the installed capacity of each of a plurality of types of generator sets in a regional power grid; and the degree P of frequency regulation participation of each of the plurality of types of generator sets is obtained based on the power grid frequency fluctuation trend under the normal operation condition and the power grid frequency fluctuation trend under the fault condition.

In S20, the degree U of frequency regulation urgency of each of a plurality of types of generator sets in a power system is calculated based on the degree P of frequency regulation participation of each of a plurality of types of generator sets and the proportion η of the installed capacity of a respective type of generator set corresponding to the degree P of frequency regulation participation, and frequency regulation participation of the regional power grid in the power system is implemented based on the degree U of frequency regulation urgency.

Compared with the related art, in the present application, a power grid frequency fluctuation trend under a normal operation condition and a power grid frequency fluctuation trend under a fault condition are obtained through simulation analysis based on the proportion of the installed capacity of each of a plurality of types of generator sets in a regional power grid, and then the degree P of frequency regulation participation of each of a plurality of types of generator sets and the proportion η of the installed capacity of a respective type of generator set corresponding to the degree P of frequency regulation participation are obtained; and the degree U of frequency regulation urgency of each of a plurality of types of generator sets in a power system is calculated, and frequency regulation participation of the regional power grid in the power system is implemented based on the degree U of frequency regulation urgency.

The following is the implementation process of the present application.

With the gradual progress of large-scale grid integration of clean energies such as wind power and nuclear power, the impact of the clean energies on the power grid has received extensive attention from the industry. Due to the intermittence and fluctuation of the wind power, it is required to configure a certain reserve capacity in a power system to satisfy frequency regulation requirements. However, a nuclear power generator set, which is the subject studied in the present application, generally operates with a base load and does not have characteristics such as the intermittence or fluctuation. Therefore, the study on the frequency regulation requirements from the perspective of the capacity for the frequency regulation requirements is not highly correlated with the nuclear power generator set.

To highlight the relationship between the nuclear power generator set and the frequency regulation requirement, the relationship between the nuclear power generator set and the frequency regulation requirement may be studied from the characteristic of a speed regulation system of the nuclear power generator set. The speed regulation system of the nuclear power generator set has characteristics such as great set deadband, rapid adjustment (tests show that the performance of the nuclear power generator set is equivalent to the performance of a thermal power generator set) and a great proportion of the installed capacity of a generator set in the local region. The frequency regulation requirement is a characterization of the depth of frequency regulation participation of a generator set in a power system in a primary frequency regulation process. The more urgently the power system needs the generator set to participate in frequency regulation, the greater the frequency regulation requirement for the generator set in the power system is. There may not be a certain correspondence between the degree of frequency regulation urgency (of the generator set in the power system) and the frequency regulation requirement (for the generator set in the power system), but the degree of frequency regulation urgency and the frequency regulation requirement should change in the same direction. Therefore, the degree of frequency regulation urgency may be used for characterizing the frequency regulation requirement.

For one regional power grid, the frequency regulation requirement for each of a plurality of types of generator sets in the power system depends on the proportion η of the installed capacity of each of a plurality of types of generator sets in this regional power grid and is also related to the degree P of frequency regulation participation of each of a plurality of types of generator sets in a primary frequency regulation process. The less the degree of participation of a generator set, the more urgently the power grid needs the generator set to participate in frequency regulation, and vice versa. Therefore, in conjunction with the preceding description that the degree of frequency regulation urgency may be used for characterizing the frequency regulation requirement, the frequency regulation requirement for a certain type of generator set in the power system is specifically analyzed through a quantitative analysis method. To facilitate analysis, a normalization process is performed on the degree of frequency regulation urgency, and correspondingly, the normalization process may also be performed on the proportion of the installed capacity of the generator set and the degree of frequency regulation participation. The present application defines the degree U of frequency regulation urgency of the generator set as a function of the proportion η of the installed capacity of this type of generator set and the degree P of frequency regulation participation of this type of generator set. According to the result of the normalization process, the formula described below applies.

$$U = \eta \times (1-P).$$

The degree of frequency regulation participation of a generator set in a primary frequency regulation process depends on the size and direction set for the deadband in the generator set. The greater the set deadband is, the less the degree of frequency regulation participation of the generator set in the primary frequency regulation process is; and the less the set dead zone is, the greater the degree of frequency regulation participation of the generator set in the primary frequency regulation process is. In the actual process of a power grid frequency variation, it is impossible that a frequency step occurs. Therefore, the method of calculating a frequency regulation component by using frequency step amplitude deducting the deadband of the generator set is not applicable to calculating the degree of frequency regulation participation. In view of that the power support capacity of the generator set within 60 s is examined in the primary frequency regulation, it is inevitable to introduce time into the calculation of the degree of frequency regulation participation in the primary frequency regulation. The present application defines the degree $P_i$ of frequency regulation participation of a certain type of generator set in the primary frequency regulation as the formula described below.

$$P_i = \frac{\int_0^{60} (f - D_i) dt}{\int_0^{60} f dt}.$$

In the formula, $D_i$ denotes the deadband of the speed regulation system of an i-type generator set. The greater the set deadband $D_i$ is, the less the distance between the frequency variation f and the deadband is, the less the area obtained through the integral of time T is, the less the value of $\int_0^{60}(f-D_i)dt$ is, and the greater the degree $P_i$ of frequency regulation participation of the generator set (or this type of generator set) in a power system is. Based on the preceding analysis, the formula described below applies.

$$U_i = \eta_i \times \left(1 - \frac{\int_0^{60}(f-D_i)dt}{\int_0^{60} fdt}\right).$$

$U_i$ denotes the degree of frequency regulation urgency of the i-type generator set in the power system. The greater the proportion $\eta_i$ of the installed capacity of this type of generator set is, the greater the degree of the frequency regulation requirement $R_i$ of this type of generator set in the power system is.

I Qualitative and Quantitative Analysis of the Degree of Frequency Regulation Urgency 1. Qualitative Analysis Frequency regulation requirements of the regional power grid are related to frequency regulation requirements under a fault condition, the characteristic of power grid frequency fluctuations under a normal operation condition and the settings of the deadband of the speed regulation system of a generator set. From the perspective of qualitative analysis, the greater the set deadband of the speed regulation system of a type of generator set is, the less the degree of frequency regulation participation is. Therefore, the settings of the deadband of the speed regulation system affect the degree of frequency regulation participation. In the case where the settings of the deadband are greater, in the condition where the proportion of the installed capacity of this type of generator set is relatively great in this case, the degree $U_i$ of the frequency regulation requirement of this type of generator set in a power system is greater.

For different regions, the degree of the frequency regulation requirement of a nuclear power generator set in a power grid is directly related to the proportion of the installed capacity of nuclear power in this region. For the same region, the degree of the frequency regulation requirement of the nuclear power in the power grid is related to different seasons or power grid operation modes. For example, in the wet season, in view of the storage capacity pressure, it is required to fully operate a hydropower generator set, in the case where the power grid frequency fluctuates, the frequency regulation requirements for the nuclear power generator set and a thermal power generator set in the system are relatively great; in the dry season, the proportion of the output of the nuclear power generator set and the proportion of the output of the thermal power generator set are relatively great, and in a steady-state condition, the frequency regulation requirement for the nuclear power generator set mainly depends on whether the spinning reserve of the thermal power generator set is sufficient; and in the case where emergency frequency support of the generator set is needed for a power grid fault, it is required to consider whether the frequency support performance of the thermal power generator set is good, and in the condition where the main steam pressure is insufficient due to the sliding pressure operation of the generator set in this case, the frequency support capacity of the thermal power generator set is weak and the nuclear power generator set is needed to provide frequency support. The preceding analysis is only limited to qualitative analysis. The frequency regulation requirements for the nuclear power generator set in the power grid in various operation conditions are also different. In the present application, frequency regulation requirements (for multiple types of generator sets) in the power grid in various scenarios are calculated through quantitative analysis so that data support is provided for the proposal of subsequent regionalized-and-differentiated primary frequency regulation performance indicators.

Figure 2A:
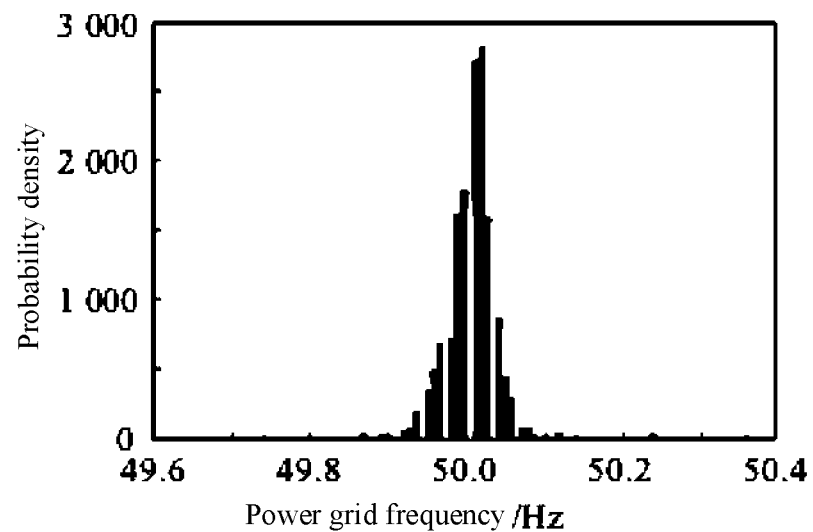
FIG. 2A is a schematic diagram illustrating the frequency distribution characteristic (probability distribution) of a regional power grid in the related art.
Figure 2B:
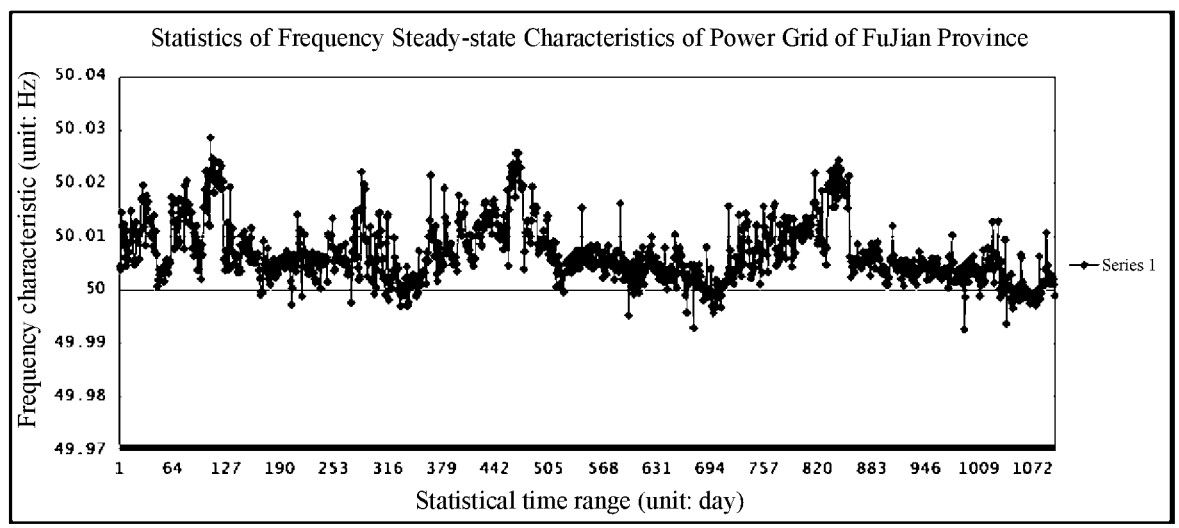
FIG. 2B is a schematic diagram illustrating the frequency characteristic (2015.09.01-2018.08.31) of a regional power grid according to an embodiment of the present application.
Figure 3:
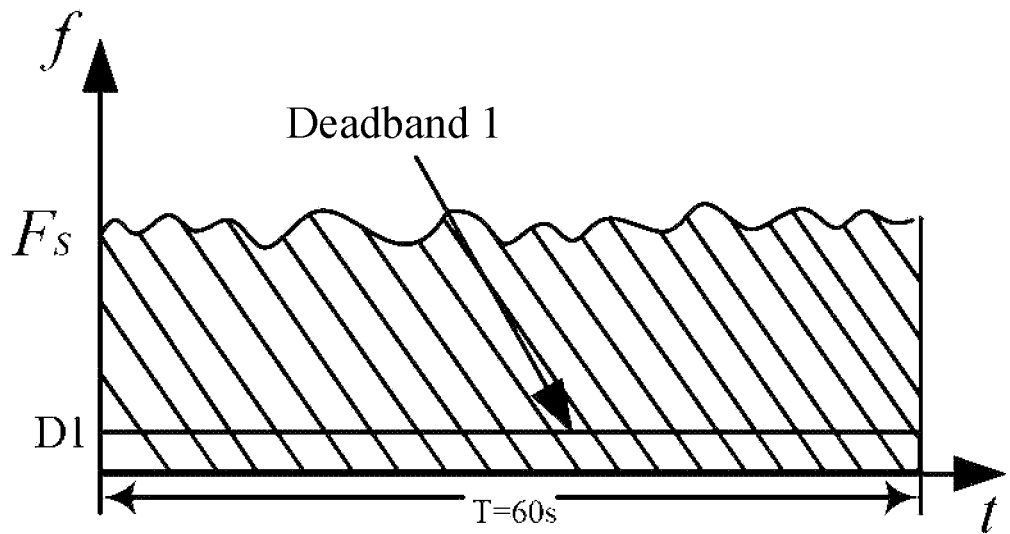
FIG. 3 is a schematic diagram illustrating the degree of frequency regulation participation of a type-1 generator set.
Figure 4:
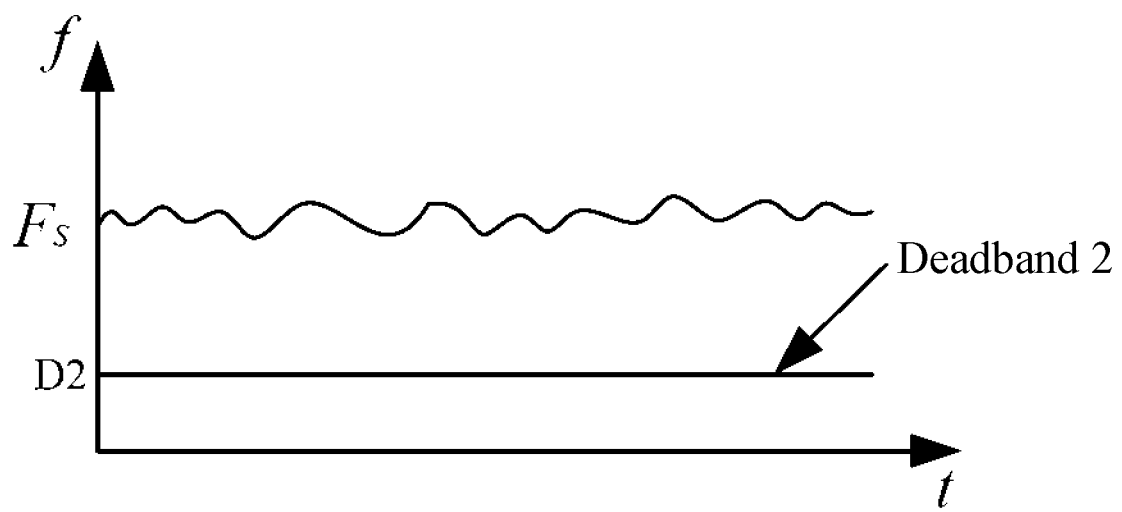
FIG. 4 is a schematic diagram illustrating the degree of frequency regulation participation of a type-2 generator set.
Figure 5:
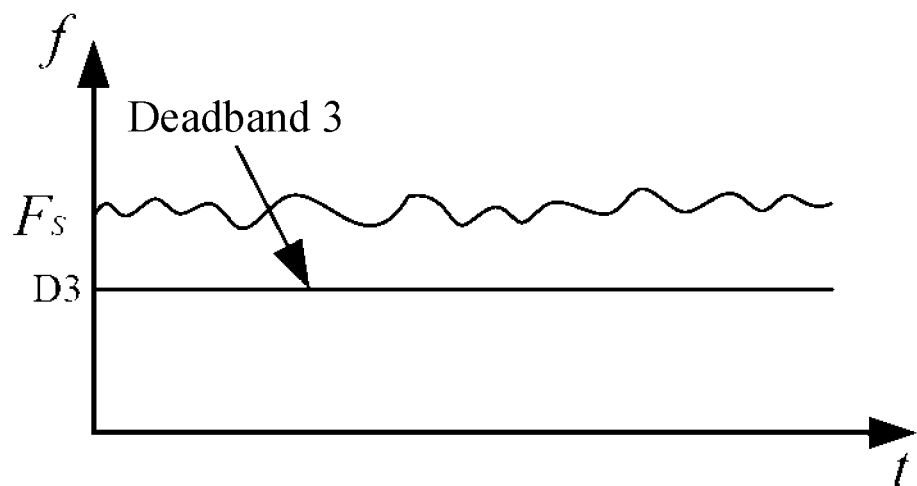
FIG. 5 is a schematic diagram illustrating the degree of frequency regulation participation of a type-3 generator set.
Figure 6:
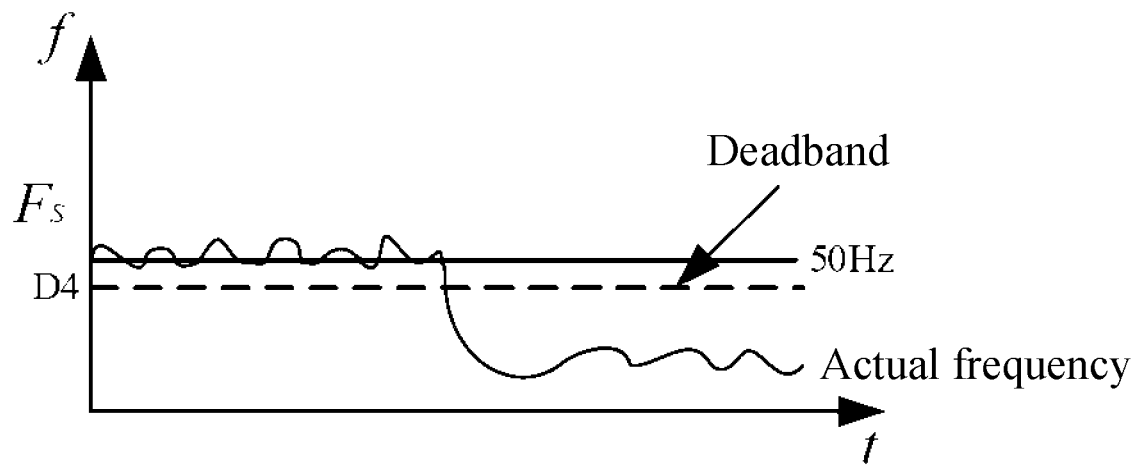
FIG. 6 is a schematic diagram illustrating that a generator set participates in primary frequency regulation in a frequency drop process caused by a power grid fault.

The degree of frequency regulation urgency in a steady-state condition may be obtained by collecting the statistical data of the steady-state frequency fluctuation trend of the power grid, such as the statistical data of the frequency variation trend of a certain regional power grid in recent years as illustrated in FIG. 2A and FIG. 2B and considering the location of the direct-current drop point of the regional power grid. For a region where the frequency varies greatly and the proportion of the installed capacity of a nuclear power generator set is relatively great, the nuclear power generator set in the region needs to deeply participate in frequency regulation.

For the qualitative analysis of the frequency regulation requirements in a transient-state process, due to the great frequency drop amplitude in the transient-state process, a frequency blank occurs. The generator sets in the power grid may fill in the power by increasing the output, thereby compensating for the power grid frequency deviation. In the frequency deviation compensation process, based on the deadband setting of the generator sets, the generator sets participating in the primary frequency regulation are sorted. For example, for one regional power grid, the proportion of the installed capacity of a thermal power generator set is relatively great, and the deadband is relatively small, thus the thermal power generator set may be given priority to participate in frequency regulation and assume the first step frequency regulation power supply; the proportion of the installed capacity of a hydropower generator set is in the middle, and the deadband is in the middle, thus the hydropower generator set may participate in frequency regulation after the thermal power generator set and assume the second step frequency regulation power supply; and the proportion of the installed capacity of a nuclear power generator set ranks third. To ensure the cohesiveness of frequency regulation and enable other types of generator sets to quickly supplement the frequency regulation power supply after the frequency exceeds a certain value and in view of the deadband setting of the nuclear power generator set (the set deadband should not be too small, otherwise too small set deadband easily causes frequent actions of nuclear rods and thus causes the latch fatigue of a nuclear rod control system), the nuclear power generator starts to participate in frequency regulation after the frequency difference exceeds a certain value. Therefore, the requirements for the settings of the frequency regulation deadband of the nuclear power generator set in the power grid may be after thermal power and hydropower, that is, may be greater than ±0.05 Hz.

2. Qualitative Analysis

FIGS. 3 to 6 list the schematic diagrams illustrating different types of generator sets that participate in primary frequency regulation. For the degree of frequency regulation urgency, the greater the proportion of the installed capacity of a certain type of generator set is, the greater the degree of frequency regulation urgency of this type of generator set is. Considering an extreme condition, assuming that this type of generator set is used as all power supplies in a certain region, the frequency regulation task is undertaken by this type of generator set; in the case where the set deadband of the speed regulation system of this type of generator set is relatively small and in view of an extreme condition where the set deadband is zero, this type of generator set may actively participate in frequency regulation in the process of a frequency variation, and thus the degree of frequency regulation urgency of this type of generator set in a power grid is less. For the frequency regulation requirement, the degree of frequency regulation urgency (the degree of the frequency regulation requirement) caused by the frequency variation in cases where the output shortage of a transient-state generator set is too great should be focused on in priority. For a regional power grid, the frequency regulation requirement for a certain type of power supply (a nuclear power generator set is used as an example) in the regional power grid is analyzed and has two characteristics described below.

First, based on the proportion of the installed capacity of a power supply in the regional power grid, in different operation modes, through the power grid frequency fluctuation trend under a normal operation condition (including particular seasons) and the power grid frequency fluctuation trend under a fault condition (For different regional power grids, a preset number of preset faults are configured for each distinct regional power grid where each preset fault is for a fault that has occurred more than a preset number of times in a present regional power grid. The preset number, the preset faults and the preset number of times are configured according to actual requirements. For example, 3 to 4 typical faults may be configured for each regional power grid.), the frequency regulation requirements for a nuclear power generator set in different scenarios are obtained, and thus quantitative requirements are raised for the frequency regulation shares undertaken by multiple types of power supplies.

Second, the analysis of the degree of frequency regulation urgency of a certain type of power supply may provide a reference for the setting of primary frequency regulation performance indicators of the certain type of power supply. In cases where the degree of frequency regulation urgency of this type of generator set in the power grid is relatively great, the threshold of the primary frequency regulation performance indicators of this type of generator set may be configured to be relatively low to satisfy the requirement for the frequency support of this type of generator set in the power grid; and in cases where the degree of frequency regulation urgency of this type of generator set in the power grid is relatively small, the threshold may be higher.

According to the preceding definition, the frequency regulation requirement (the degree of frequency regulation urgency) of a generator set in the power system is U. U is related to the degree P of frequency regulation participation (as defined above) and the proportion of the installed capacity of this type of generator set, which may be expressed by the formula described below.

$$\begin{cases} U_i = (1 - P_i) \Box \eta_i \\ P_i = \dfrac{S_i}{S} \end{cases}.$$

In this formula, $U_i$ denotes the frequency regulation requirement of an i-type generator set in the power system, $S_i$ denotes a frequency regulation integral area of the i-type generator set deducting a deadband within frequency fluctuation time of 60 s and S denotes a frequency regulation integral area within the power grid frequency fluctuation time of 60 s; i=1, 2 and 3, indicating that types of generator sets are a thermal power generator set, a hydropower generator set and a nuclear power generator set respectively. The ratio between $S_i$ and S may be defined as the degree $P_i = S_i/S$ of frequency regulation participation of a respective generator set. In the figure, $F_S$ denotes the value at the start time of the power grid frequency variation trend and the calculation is performed based on an integral time of 60 s. The actual calculation process is illustrated in the preceding formula of the degree $P_i$ of frequency regulation participation.

In an embodiment, the generator sets in the power grid that can participate in primary frequency regulation include a nuclear power generator set, a hydropower generator set and a thermal power generator set. There may be other types of new energy generator sets (power supplies) such as a wind power generator set and a photovoltaic generator set in the regional power grid. However, the preceding new energy generator sets generally do not participate in the primary frequency regulation in the system. From the perspective of the frequency regulation requirement, it seems that the frequency regulation requirement has nothing to do with the deadband setting of a generator set. However, the less the set deadband of a certain type of generator set is, for the same regional power grid, the greater the degree of frequency regulation participation of this generator set in the primary frequency regulation in the power grid is. Accordingly, the power grid may accept more output support of this type of generator set. Therefore, the frequency fluctuations are less, and in this case, the degrees of frequency regulation urgency of other generator sets in the power grid are weakened. To sum up, the primary frequency regulation requirements of the power grid are related to the settings of the deadband of multiple types of generator sets. In view of that the wind power generator set and the photovoltaic generator set generally do not participate in frequency regulation, at present, the thermal power generator set (including a combined cycle generator set), the hydropower generator set and the nuclear power generator set are used for providing power support. To quantitatively study the degree of frequency regulation urgency, the capacity proportion of the thermal power generator set, the capacity proportion of the hydropower generator set and the capacity proportion of the nuclear power generator set are expressed as $\eta_1$, $\eta_2$ and $\eta_3$ respectively, and the deadband of the preceding thermal power generator set, and the deadband of the preceding hydropower generator set and the deadband of the preceding nuclear power generator set are set to $D_1$, $D_2$ and $D_3$ respectively. The less the set deadband is, the greater the degree of frequency regulation participation of a generator set during a frequency fluctuation process is. In view of an extreme condition where the deadband of the generator set is set to zero, the output of the generator set responds quickly in the case where any frequency fluctuation occurs in the power grid. In this case, the power system does not need to raise frequency regulation requirements for the generator set, and the generator set rapidly responds to power grid frequency fluctuations. It may be considered that the degree of frequency regulation urgency of the generator set is relatively low.

Figure 7:
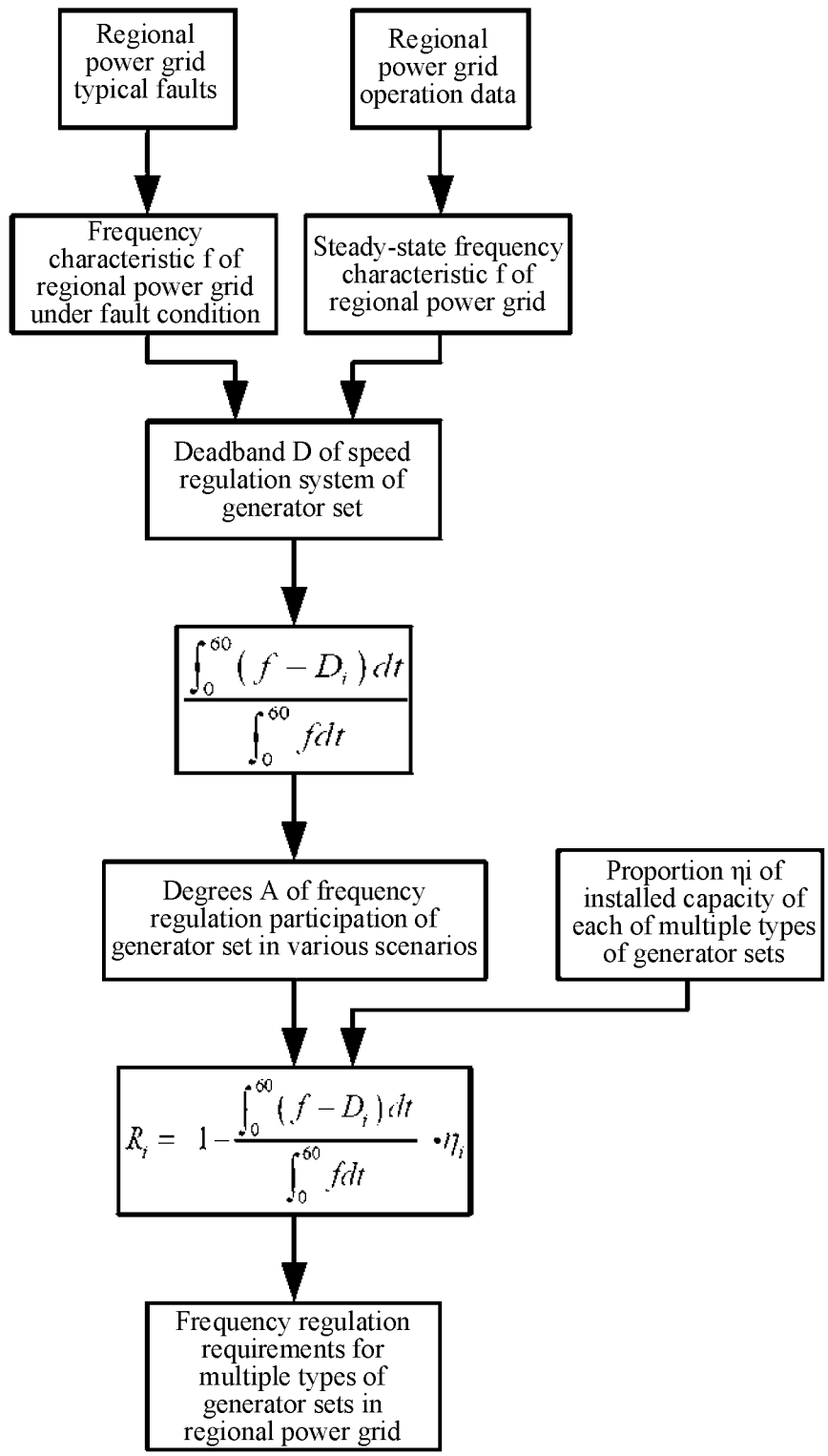
FIG. 7 is a flowchart of a method for evaluating a degree of frequency regulation urgency of a generator set in view of frequency regulation requirements of a power system according to an embodiment of the present application.

II the Implementation of the Degree of Frequency Regulation Urgency of the Generator Set in the Power Grid To make a quantitative analysis, as illustrated in FIG. 7, the present application proposes a method for quantitatively assessing the frequency regulation requirements of a regional power grid and the implementation scheme of the method.

(1) One regional power grid is selected as the study object. According to annual frequency statistics obtained by the SCADA system, a steady-state frequency characteristic of the regional power grid is acquired.

(2) Typical faults are configured for the regional power grid, and the frequency variation trend in a fault scenario is obtained through simulation analysis.

(3) Through the setting of the frequency deadband of the speed regulation system of a nuclear power generator set, the long-term high-frequency frequency fluctuations in the condition of no fault in the power grid (steady state) should be avoided so that frequent actions of nuclear rods are avoided, and thus the mechanical fatigue caused by the frequent actions of the nuclear rods are avoided; the power grid frequency regulation requirements should be based on the characteristic of frequency fluctuations in the fault scenario, and the greater the set deadband of the speed regulation system of the generator set is, the less the output contribution of the generator set in a frequency drop process is, which may cause the frequency to drop further until the dead zone is crossed and thus cause the adjustment of the generator set output.

(4) Generally speaking, most of the frequency fluctuations reflected by the steady-state frequency characteristic of the power grid are located within the frequency deadband (2 r/min). Even if the frequency fluctuations reflected by the steady-state frequency characteristic of the power grid are beyond the frequency deadband, the frequency fluctuates regularly around the frequency deadband. Therefore, the steady-state frequency characteristic of the regional power grid is not applicable to directly calculating the degree of frequency regulation participation.

(5) From the perspective of traditional frequency regulation requirements, the capacity for the frequency regulation requirements should be calculated, and this capacity for the frequency regulation requirements is the spinning reserve capacity stored for a volatile power supply. In the present application, the frequency regulation requirements are interpreted as the degrees of frequency regulation urgency of multiple types of generator sets in the power grid. The greater the frequency regulation requirements are, the greater the degrees of frequency regulation urgency are; and the less the frequency regulation requirements are, the less the degrees of frequency regulation urgency are.

Figure 8:
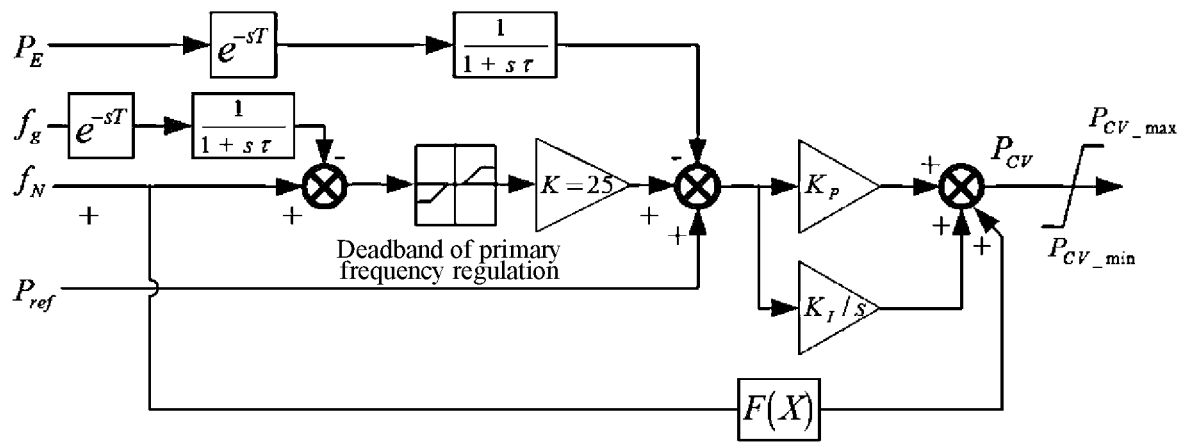
FIG. 8 is a schematic diagram illustrating the control logic of the primary frequency regulation loop of the steam turbine of a second-generation semi-reactor nuclear power generator set according to an embodiment of the present application.

III Regional Power Grid Frequency Regulation Control Strategy and the Implementation Scheme of the Strategy in View of the Characteristic of the Primary Frequency Regulation of a Generator Set 1. The Characteristic of the Primary Frequency Regulation of a Nuclear Island Rod Control System of a Nuclear Power Generator Set The nuclear power generator set also uses a steam turbine to convert thermal energy into mechanical energy, so the control principle of the primary frequency regulation control loop of the conventional island of the nuclear power generator set is similar to the control principle of the primary frequency regulation loop of a thermal power generator set. The schematic diagram illustrating the control logic of the primary frequency regulation loop of the steam turbine of the nuclear power generator set is illustrated in FIG. 8.

Figure 9:
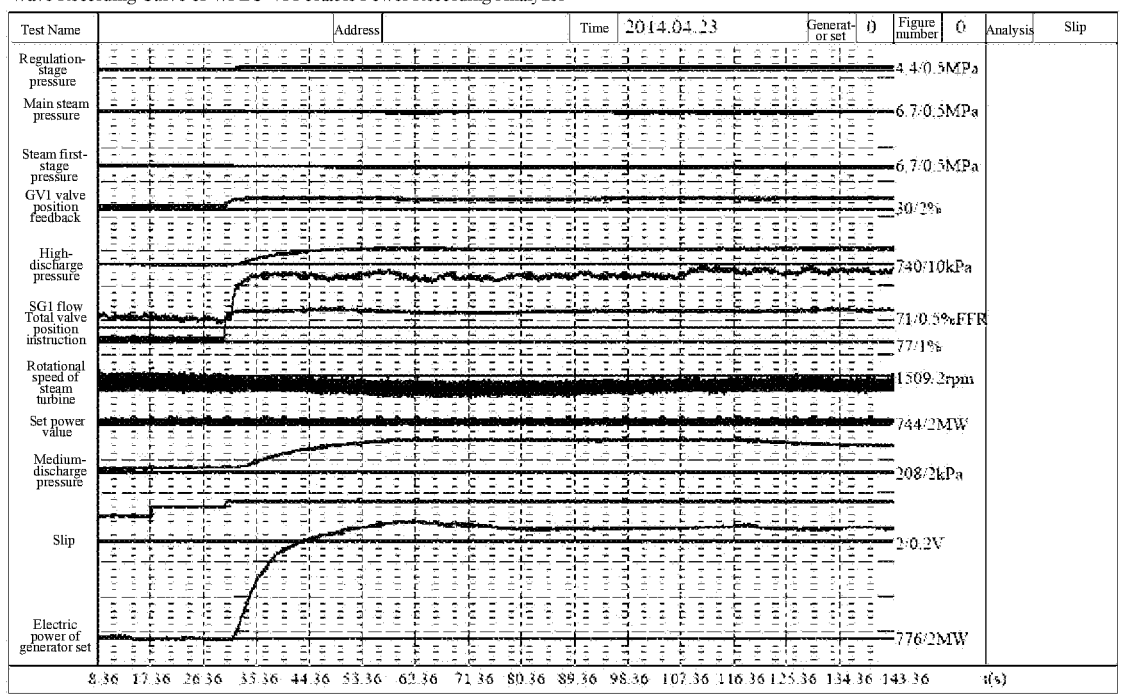
FIG. 9 is a diagram illustrating oscillation recording in primary frequency regulation having a frequency step of 0.12 Hz for a second-generation semi-reactor nuclear power generator set according to an embodiment of the present application.
Figure 10:
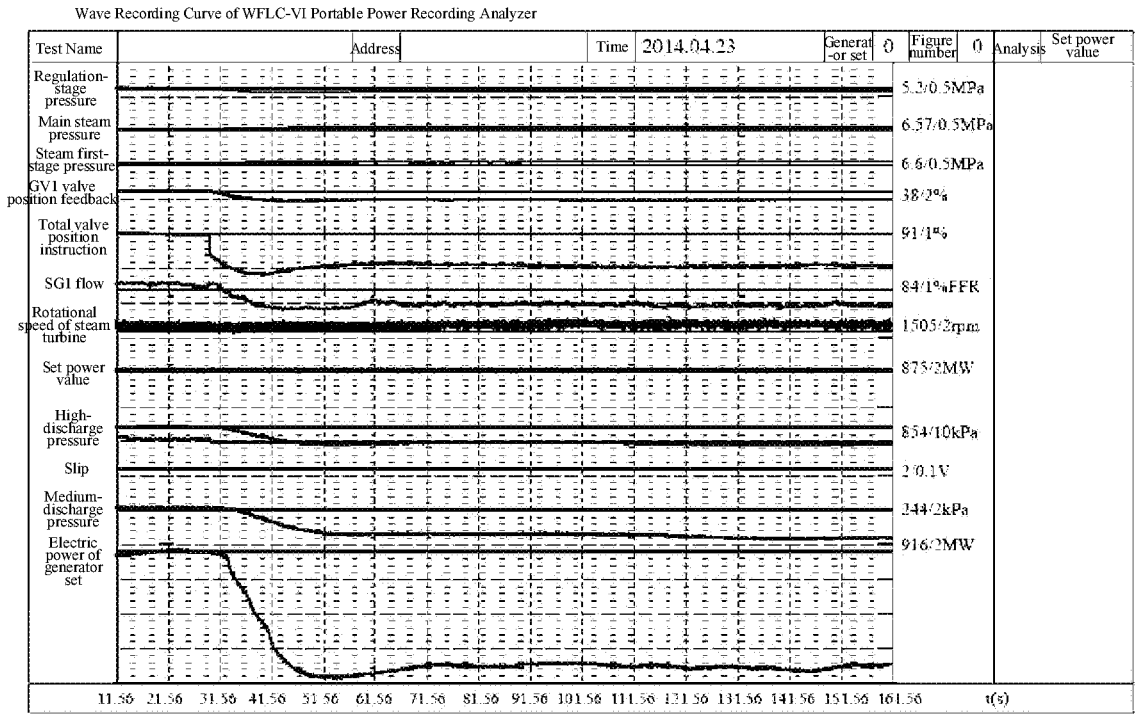
FIG. 10 is a diagram illustrating oscillation recording in primary frequency regulation having a frequency step of −0.12 Hz for a second-generation semi-reactor nuclear power generator set according to an embodiment of the present application.

It can be seen from FIG. 9 and FIG. 10 that during a 6% primary frequency regulation test of this nuclear power generator set, the frequency steps 0.12 Hz, the power response lag time is about 1.7 s, the 75% target value is reached in about 12 s, and the stabilization time is about 30 s. The performance of the primary frequency regulation test of this nuclear power generator set is equivalent to the performance of the primary frequency regulation test of a thermal power generator set with the same capacity as this nuclear generator set. In terms of the influence on a thermal system, a power step-up test of the primary frequency regulation of 6% rated power causes the main steam pressure of a secondary circuit to drop from 6.76 MPa to 6.58 MPa and remain stable. The main steam pressure drops by about 2.7%. The per-unit value of the pressure variation is less than the per-unit value of the power variation.

2. Stepped Frequency Regulation Control Strategy in a Regional Power Grid

Figure 11:
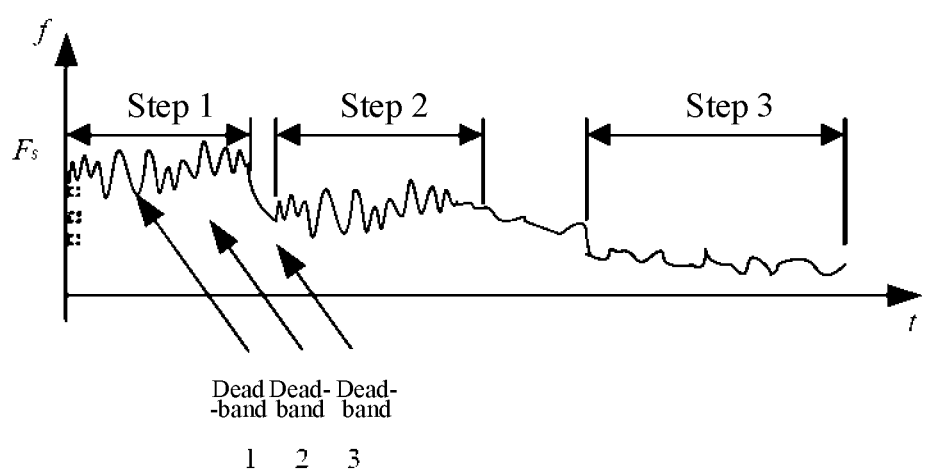
FIG. 11 is a schematic diagram illustrating=different types of power supplies participating in a frequency fluctuation process.
Figure 12:
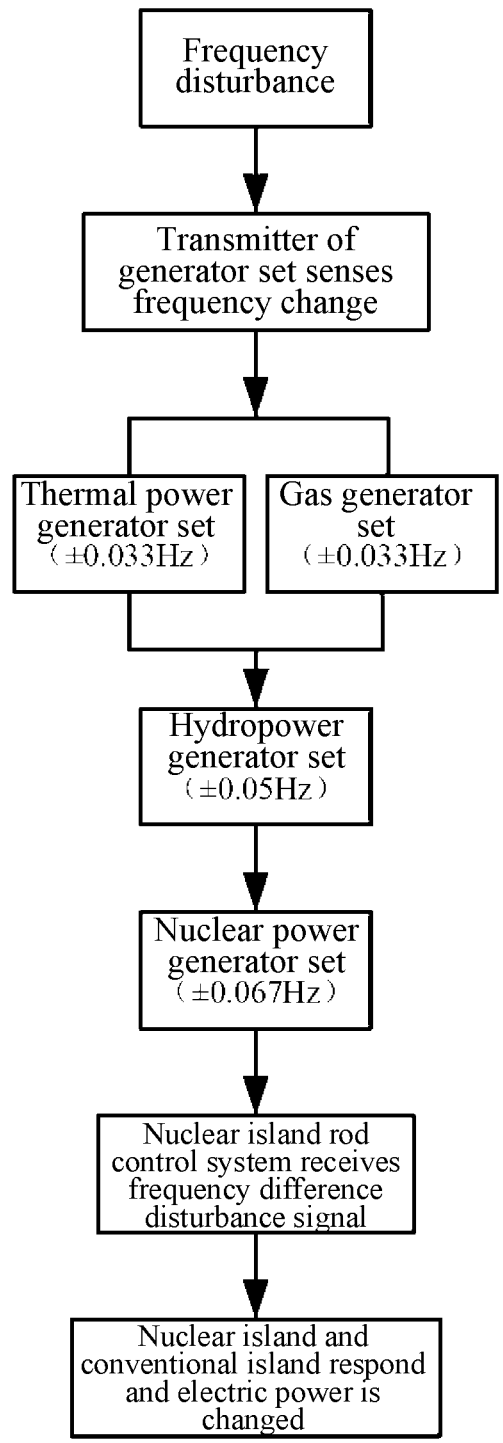
FIG. 12 is a schematic diagram illustrating different types of power supplies participating in a frequency fluctuation process.

In terms of frequency response, in the case where the frequency is disturbed, the control loop of a turbine governing (GRE) system receives a frequency difference signal, generates a frequency regulation component and sends the frequency regulation component to the control loop of a full length rod control (RGL) system to trigger the action of a power regulating rod (G rod) and the act of a temperature regulating rod (R rod). In the condition where the set deadband of the control loop of the GRE system is relatively small, the GRE system generates frequency regulation components frequently, the control loop of the RGL system generates action signals frequently, the signals cause frequent actions of nuclear rods, and thus the frequent actions of the nuclear rods approach the fatigue tolerance limit of the nuclear rod action. In the condition where the set deadband of the control loop of the GRE system is relatively great, the control loop of the GRE system is unable to respond to the requirements of network frequency fluctuations in time. Therefore, to avoid frequent actions, the set deadband of the speed regulation system of the nuclear power generator set should not be too small. In view of the fact that the main power supplies of most of the power grids are still conventional thermal power generator sets and conventional hydropower generator sets, and especially in some regions (such as northern China), the mainly installed machines are the thermal power generator sets, so thermal power should be used as the first-stage frequency regulation power supply and hydropower should be used as the second-stage frequency regulation power supply. In view of nuclear safety, the nuclear power generator set may be used as the third-stage frequency regulation power supply. The participation of multiple types of frequency regulation power supplies in the process of a frequency variation is shown in FIG. 11. The schematic diagram illustrating that different types of power supplies participate in a frequency fluctuation process is illustrated in FIG. 12.

Figure 13:
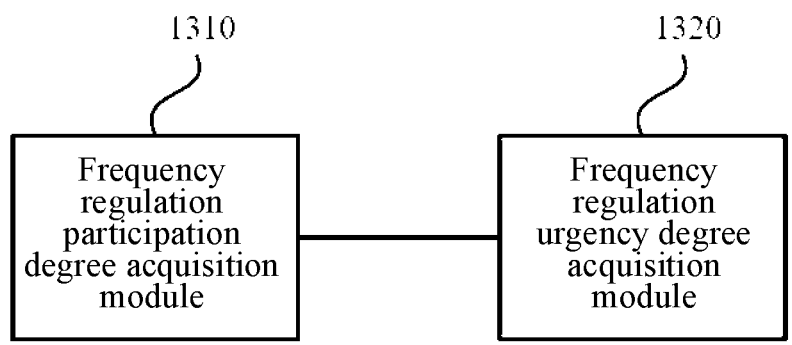
FIG. 13 is a block diagram illustrating an apparatus for evaluating a degree of frequency regulation urgency of a generator set according to an embodiment of the present application.

FIG. 13 is a block diagram illustrating an apparatus for evaluating a degree of frequency regulation urgency of a generator set according to an embodiment of the present application.

Referring to FIG. 13, this apparatus includes a frequency regulation participation degree acquisition module 1310 and a frequency regulation urgency degree acquisition module 1320.

The frequency regulation participation degree acquisition module 1310 is configured to obtain a power grid frequency fluctuation trend under a normal operation condition and a power grid frequency fluctuation trend under a fault condition through simulation analysis based on the proportion $\eta$ of the installed capacity of each of a plurality of types of generator sets in a regional power grid, and obtain the degree P of frequency regulation participation of each of a plurality of types of generator sets based on the power grid frequency fluctuation trend under the normal operation condition and the power grid frequency fluctuation trend under the fault condition.

The frequency regulation urgency degree acquisition module 1320 is configured to calculate the degree U of frequency regulation urgency of each of a plurality of types of generator sets in a power system based on the degree P of frequency regulation participation of each of a plurality of types of generator sets and the proportion η of the installed capacity of a respective type of generator set corresponding to the degree P of frequency regulation participation, and implement frequency regulation participation of the regional power grid in the power system based on the degree U of frequency regulation urgency.

The apparatus provided by the present disclosure may perform the method provided by any embodiment of the present disclosure, and the apparatus has the corresponding functional modules and effects for performing the method.

Figure 14:
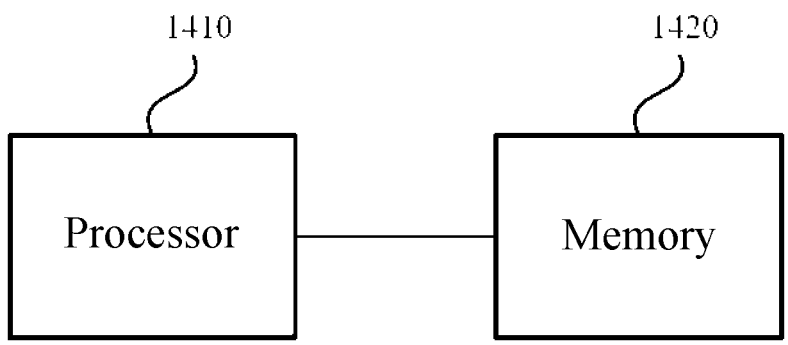
FIG. 14 is a block diagram illustrating a power system according to an embodiment of the present application.

FIG. 14 is a block diagram illustrating a power system based on an embodiment of the present application. Referring to FIG. 14, the power system includes one or more processors 1410, a memory 1420 configured to store one or more programs.

When executed by the one or more processors 1410, the one or more programs cause the one or more processors 1410 to perform the method of any one of the preceding embodiments.

Embodiments of the present disclosure further provide a computer-readable storage medium storing one or more computer programs. When executed by one or more processors, the one or more programs cause the one or more processors to perform the method of any one of the preceding embodiments.

The preceding computer-readable medium of the present disclosure may be a computer-readable signal medium or a computer-readable storage medium or any combination of the two. The computer-readable storage medium may be, but is not limited to, an electrical, magnetic, optical, electromagnetic, infrared or semiconductor system, apparatus or device, or any combination thereof. The computer-readable storage media may include (non-exhaustive list): an electrical connection having one or more wires, a portable computer disk, a hard disk, a random-access memory (RAM), a read-only memory (ROM), an erasable programmable read-only memory (EPROM) or flash memory, an optical fiber, a portable compact disk read-only memory (CD-ROM), an optical memory device, a magnetic memory device, or any suitable combination thereof. In the present disclosure, the computer-readable storage medium may be any tangible medium containing or storing a program. The program may be used by or used in conjunction with an instruction execution system, apparatus or device. In the present disclosure, the computer-readable signal medium may include a data signal propagated on a base band or as a part of a carrier wave. The data signal carries computer-readable program codes. This propagated data signal may take multiple forms including, but not limited to, an electromagnetic signal, an optical signal, or any suitable combination thereof. The computer-readable signal medium may further be any computer-readable medium other than a computer-readable storage medium. The computer-readable signal medium may send, propagate or transmit the program used by or used in conjunction with the instruction execution system, apparatus or device. The program codes contained on the computer-readable medium may be transmitted on any suitable medium, including, but not limited to, wire, optical cable, radio frequency (RF), and the like, or any suitable combination thereof.

It should be understood by those having ordinary skill in the art that embodiments of the present application may be provided as methods, systems and computer program products. Therefore, the present application may take the form of a hardware embodiment, a software embodiment, or a combination of software and hardware embodiments. In addition, the present application may take the form of a computer program product implemented on one or more computer-usable storage media (including, but not limited to, a disk memory, a CD-ROM and an optical memory) that include computer-usable program codes.

The present application is described with reference to flowcharts and/or block diagrams of methods, apparatuses (systems) and computer program products according to embodiments of the present application. It should be understood that computer program instructions may implement each flow and/or block in the flowcharts and/or block diagrams and a combination of flows and/or blocks in the flowcharts and/or block diagrams. These computer program instructions may be provided for a processor of a general-purpose computer, a special-purpose computer, an embedded processor or another programmable data processing device to produce a machine, so that instructions, which are executed via the processor of the computer or another programmable data processing device, create an apparatus for implementing the functions specified in one or more flows in the flowcharts and/or one or more blocks in the block diagrams.

These computer program instructions may also be stored in a computer-readable memory which is able to direct a computer or another programmable data processing device to operate in a particular manner, so that the instructions stored in the computer-readable memory produce an article of manufacture including instruction means which implement the functions specified in one or more flows in the flowcharts and/or one or more blocks in the block diagrams.

These computer program instructions may also be loaded onto a computer or another programmable data processing device so that a series of operation steps are performed on the computer or the other programmable device to produce processing implemented by a computer. Therefore, instructions executed on a computer or another programmable device provide steps for implementing the functions specified in one or more flows in the flowcharts and/or one or more blocks in the block diagrams.

What is claimed is:

1. A method for evaluating a degree of frequency regulation urgency of a generator set, comprising:
obtaining a power grid frequency fluctuation trend under a normal operation condition and a power grid frequency fluctuation trend under a fault condition through simulation analysis based on a proportion η of an installed capacity of each of a plurality of types of generator sets in a regional power grid, and obtaining a degree P of frequency regulation participation of each of the plurality of types of generator sets based on the power grid frequency fluctuation trend under the normal operation condition and the power grid frequency fluctuation trend under the fault condition; and
calculating a degree U of frequency regulation urgency of each of a plurality of types of generator sets in a power system based on the degree P of frequency regulation participation of each of the plurality of types of generator sets and the proportion η of the installed capacity of a respective type of generator set corresponding to the degree P of frequency regulation participation, and implementing frequency regulation participation of the regional power grid in the power system based on the degree U of frequency regulation urgency;

wherein the degree U of frequency regulation urgency and the degree P of frequency regulation participation of each of the plurality of types of generator sets in the power system are calculated using the following formulas:

$$\begin{cases} U_i = (1 - P_i) \Box \eta_i \\ P_i = \dfrac{S_i}{S} \end{cases},$$

wherein $U_i$ denotes the degree U of frequency regulation urgency of an i-type generator set in the power system, $S_i$ denotes a frequency regulation integral area of the i-type generator set deducting a deadband within a frequency fluctuation time T, and S denotes a frequency regulation integral area within the frequency fluctuation time T of the power grid, where i=1, 2, and 3, indicating that the types of generator sets are a thermal power generator set, a hydropower generator set, and a nuclear power generator set, respectively;

wherein a degree $P_i$ of frequency regulation participation of each of the plurality of types of generator sets in primary frequency regulation is calculated using the following formula:

$$P_i = \dfrac{\int_0^T (f - D_i) dt}{\int_0^T f dt},$$

where f denotes a power grid frequency variation, and $D_i$ denotes a deadband of a speed regulation system of the i-type generator set.

2. The method of claim 1, further comprising the following operation before obtaining the power grid frequency fluctuation trend under the normal operation condition and the power grid frequency fluctuation trend under the fault condition through the simulation analysis based on the proportion η of the installed capacity of each of the plurality of types of generator sets in the regional power grid:

acquiring a steady-state frequency characteristic of the regional power grid based on annual frequency statistics obtained by a supervisory control and data acquisition (SCADA) system.

3. The method of claim 1, wherein the plurality of types of generator sets comprise a thermal power generator set, a hydropower generator set, and a nuclear power generator set.

4. The method of claim 1, wherein there are configured a preset number of preset faults for each distinct regional power grid, wherein each of the preset faults is a fault that has occurred more than a preset number of times in a corresponding regional power grid.

5. The method of claim 1, wherein the frequency fluctuation time T is 60s, and the degree $P_i$ of frequency regulation participation of each of the plurality of types of generator sets in the primary frequency regulation is calculated using the following formula:

$$P_i = \dfrac{\int_0^{60} (f - D_i) dt}{\int_0^{60} f dt}.$$

6. The method of claim 5, wherein the degree U of frequency regulation urgency of each of the plurality of types of generator sets in the power system is calculated using the following formula:

$$U_i = \eta_i \times \left(1 - \dfrac{\int_0^{60} (f - D_i) dt}{\int_0^{60} f dt}\right),$$

where $\eta_i$ denotes a proportion of an installed capacity of the i-type generator set.

7. An apparatus for evaluating a degree of frequency regulation urgency of a generator set, comprising:

a frequency regulation participation degree acquisition module, configured to obtain a power grid frequency fluctuation trend under a normal operation condition and a power grid frequency fluctuation trend under a fault condition through simulation analysis based on a proportion η of an installed capacity of each of a plurality of types of generator sets in a regional power grid, and obtain a degree P of frequency regulation participation of each of the plurality of types of generator sets based on the power grid frequency fluctuation trend under the normal operation condition and the power grid frequency fluctuation trend under the fault condition; and a frequency regulation urgency degree acquisition module, configured to calculate a degree U of frequency regulation urgency of each of the plurality of types of generator sets in a power system based on the degree P of frequency regulation participation of each of the plurality of types of generator sets and the proportion η of the installed capacity of a respective type of generator set corresponding to the degree P of frequency regulation participation, and implement frequency regulation participation of the regional power grid in the power system based on the degree U of frequency regulation urgency;

wherein the degree U of frequency regulation urgency and the degree P of frequency regulation participation of each of the plurality of types of generator sets in the power system are calculated using the following formulas:

$$\begin{cases} U_i = (1 - P_i) \Box \eta_i \\ P_i = \dfrac{S_i}{S} \end{cases},$$

wherein $U_i$ denotes the degree U of frequency regulation urgency of an i-type generator set in the power system, $S_i$ denotes a frequency regulation integral area of the i-type generator set deducting a deadband within a frequency fluctuation time T, and S denotes a frequency regulation integral area within the frequency fluctuation time T of the power grid, where i=1, 2, and 3, indicating that the types of generator sets are a thermal power generator set, a hydropower generator set, and a nuclear power generator set, respectively;

wherein a degree $P_i$ of frequency regulation participation of each of the plurality of types of generator sets in primary frequency regulation is calculated using the following formula:

$$P_i = \frac{\int_0^T (f - D_i)dt}{\int_0^T f\,dt},$$

where f denotes a power grid frequency variation, and $D_i$ denotes a deadband of a speed regulation system of the i-type generator set.

8. A power system, comprising:
one or more processors; and
a memory configured to store one or more programs, wherein the one or more programs when executed by the one or more processors cause the one or more processors to perform the method of claim 1.

9. A computer-readable storage medium storing one or more computer programs, wherein the one or more programs when executed by one or more programs cause the one or more processors to perform the method of claim 1.

10. The power system of claim 8, wherein the method further comprises the following operation before obtaining the power grid frequency fluctuation trend under the normal operation condition and the power grid frequency fluctuation trend under the fault condition through the simulation analysis based on the proportion η of the installed capacity of each of the plurality of types of generator sets in the regional power grid:
acquiring a steady-state frequency characteristic of the regional power grid based on annual frequency statistics obtained by a supervisory control and data acquisition (SCADA) system.

11. The power system of claim 8, wherein the plurality of types of generator sets comprise a thermal power generator set, a hydropower generator set, and a nuclear power generator set.

12. The power system of claim 8, wherein there are configured a preset number of preset faults for each distinct regional power grid, wherein each of the preset faults is a fault that has occurred more than a preset number of times in a corresponding regional power grid.

13. The power system of claim 8, wherein the frequency fluctuation time T is 60s, and the degree $P_i$ of frequency regulation participation of each of the plurality of types of generator sets in the primary frequency regulation is calculated using the following formula:

$$P_i = \frac{\int_0^{60} (f - D_i)dt}{\int_0^{60} f\,dt}.$$

14. The power system of claim 13, wherein the degree U of frequency regulation urgency of each of the plurality of types of generator sets in the power system is calculated using the following formula:

$$U_i = \eta_i \times \left(1 - \frac{\int_0^{60} (f - D_i)dt}{\int_0^{60} f\,dt}\right),$$

where $\eta_i$ denotes a proportion of an installed capacity of the i-type generator set.

15. The computer-readable storage medium of claim 9, wherein the method further comprises the following operation before obtaining the power grid frequency fluctuation trend under the normal operation condition and the power grid frequency fluctuation trend under the fault condition through the simulation analysis based on the proportion η of the installed capacity of each of the plurality of types of generator sets in the regional power grid:
acquiring a steady-state frequency characteristic of the regional power grid based on annual frequency statistics obtained by a supervisory control and data acquisition (SCADA) system.

16. The computer-readable storage medium of claim 9, wherein the plurality of types of generator sets comprise a thermal power generator set, a hydropower generator set, and a nuclear power generator set.

* * * * *